(12) United States Patent
Holmquist

(10) Patent No.: US 11,366,274 B2
(45) Date of Patent: Jun. 21, 2022

(54) FERRULE OPTICAL CONNECTORS WITH A DISPLACED CORE FOR BONDING OPTICAL FIBERS

(71) Applicant: COMMSCOPE TECHNOLOGIES LLC, Hickory, NC (US)

(72) Inventor: Marlon E. Holmquist, St. Peter, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/757,293

(22) PCT Filed: Oct. 19, 2018

(86) PCT No.: PCT/US2018/056708
§ 371 (c)(1),
(2) Date: Apr. 17, 2020

(87) PCT Pub. No.: WO2019/079717
PCT Pub. Date: Apr. 25, 2019

(65) Prior Publication Data
US 2021/0191049 A1    Jun. 24, 2021

Related U.S. Application Data

(60) Provisional application No. 62/575,034, filed on Oct. 20, 2017.

(51) Int. Cl.
*G02B 6/38* (2006.01)
(52) U.S. Cl.
CPC ......... *G02B 6/3861* (2013.01); *G02B 6/3825* (2013.01); *G02B 6/3869* (2013.01)

(58) Field of Classification Search
CPC .. G02B 6/3861; G02B 6/3825; G02B 6/3831; G02B 6/3869
USPC ........................................... 385/80
See application file for complete search history.

(56) References Cited

U.S. PATENT DOCUMENTS

| | | | |
|---|---|---|---|
| 5,282,258 A * | 1/1994 | Hoshino | G02B 6/3861 385/145 |
| 5,772,720 A * | 6/1998 | Taira-Griffin | C03B 37/15 264/1.26 |
| 5,815,619 A * | 9/1998 | Bloom | G02B 6/3855 385/60 |

(Continued)

FOREIGN PATENT DOCUMENTS

| | | |
|---|---|---|
| JP | 2000-266957 A | 9/2000 |
| JP | 2001-096570 A | 4/2001 |

OTHER PUBLICATIONS

Extended European Search Report for European Patent Application No. 18868518.4 dated Jun. 18, 2021, 8 pages.

(Continued)

*Primary Examiner* — Kaveh C Kianni
(74) *Attorney, Agent, or Firm* — Merchant & Gould P.C.

(57) ABSTRACT

Aspects and techniques of the present disclosure relates to an improved process for easily securing an optical fiber within a ferrule of a fiber optic connector which negates the use of epoxies or adhesives. The present disclosure further relates to a method for anchoring an optical fiber in a connector of the kind described, where a solvent agent is used rather than epoxies or adhesives.

13 Claims, 4 Drawing Sheets

(56) References Cited

U.S. PATENT DOCUMENTS

| | | | |
|---|---|---|---|
| 5,917,975 A * | 6/1999 | Bloom | G02B 6/2551 385/78 |
| 6,000,858 A * | 12/1999 | Bloom | G02B 6/2551 385/94 |
| 6,004,046 A * | 12/1999 | Sawada | G02B 6/4248 385/92 |
| 6,074,101 A * | 6/2000 | Bloom | G02B 6/3855 385/60 |
| 6,435,731 B1 | 8/2002 | Tadashi et al. | |
| 6,576,165 B2 | 6/2003 | Aloisio et al. | |
| 7,239,765 B1 * | 7/2007 | Bramson | G02B 6/126 385/122 |
| 9,268,101 B2 | 2/2016 | Danley et al. | |
| 9,541,705 B2 | 1/2017 | Danley et al. | |
| 2002/0110332 A1 * | 8/2002 | Clarkin | G02B 6/02209 385/78 |
| 2009/0148109 A1 * | 6/2009 | Takahashi | G02B 6/3846 385/98 |
| 2014/0064665 A1 | 3/2014 | Ott et al. | |
| 2014/0093212 A1 | 4/2014 | Ott et al. | |
| 2015/0093080 A1 * | 4/2015 | DeRosa | B32B 37/142 385/80 |
| 2015/0219860 A1 * | 8/2015 | Danley | G02B 6/3855 156/66 |
| 2016/0363732 A1 | 12/2016 | Zimmel et al. | |
| 2017/0075076 A1 * | 3/2017 | Fewkes | B29D 11/00673 |

OTHER PUBLICATIONS

"Solvent Welding & Sealing—Benefits of Solvent Bonding", 10 pages (Jun. 2017); retrieved from the Internet: https://radiofrequencywelding.com/benefits-of-solvent-bonding/ (retrieved on Jun. 9, 2021).

Manas, D. et al., "Bonding of Thermoplastics", Trends in the Development of Machinery and Associated Technology, 367-370 (Sep. 2007).

International Search Report and Written Opinion of the International Searching Authority for International Patent Application No. PCT/US2018/056708 dated Mar. 12, 2019, 12 pages.

* cited by examiner

FERRULE OPTICAL CONNECTORS WITH A DISPLACED CORE FOR BONDING OPTICAL FIBERS

CROSS-REFERENCE TO RELATED APPLICATION

This application is a National Stage Application of PCT/US2018/056708, filed on Oct. 19, 2018, which claims the benefit of U.S. Patent Application Ser. No. 62/575,034, filed on Oct. 20, 2017, the disclosures of which are incorporated herein by reference in their entireties. To the extent appropriate, a claim of priority is made to each of the above disclosed applications.

TECHNICAL FIELD

The present disclosure relates to techniques for terminating the ends of fiber optic cables with ferrules.

BACKGROUND

A typical fiber optic connector includes a fiber ferrule made of ceramic, such as zirconia, or metal, such as stainless steel and a ferrule holder, commonly known as a hub, retaining the ferrule. In the case of a single fiber ferrule, a high precision hole can be formed in the center of the ferrule, and a stripped bare fiber (the glass core and glass cladding with the coating removed) can be inserted therethrough. A fiber optic connector can include a ferrule with one or more holes that receive one or more optical fibers. The ferrule supports and positions the optical fiber(s) with respect to a housing of the fiber optic connector.

Typically the end of a fiber optic cable is terminated by a fiber optic connector by securing the fiber to a ferrule of the connector using an adhesive such as epoxy. A well known fiber optic cable size includes an inner glass fiber of 125 microns in diameter, with an outer coating of 250 microns in diameter, covered by a polymeric buffer layer of 900 microns in diameter.

The use of epoxies can sometimes make the manufacturing process difficult. For example, epoxy can be difficult to apply uniformly to the ferrules such that the quality of adhesive bond may vary. Epoxies may be susceptible to moisture and chemicals, which may cause the epoxy to break down upon exposure to moisture. Changes in temperature may also cause fiber breakage due to poor thermal characteristics of the epoxy, resulting in expansion or contraction. The need for precise mixing, a limited pot life after mixing, and long cure times after application are other challenges that epoxy typically presents.

There is a need to secure optical fibers within ferrules, and/or other structures, quickly, reliably, and inexpensively.

SUMMARY

One aspect of the present disclosure relates to a fiber optic connector that can be easily installed or assembled without the use of epoxies or adhesives, and properly supports the fiber within the ferrule to ensure that the fiber does not move relative to the ferrule over time.

To achieve the advantages and novel features, the present disclosure is generally directed to a fiber optic connector having a ferrule in which a fiber is secured in the ferrule without the use of any adhesive or epoxy. The ferrule includes an endface in which a cavity is formed therein. A solvent material is disposed in the cavity that has an aperture for receiving the fiber therethrough. The disk can be deformed such that it grips the fiber and prevents relative movement between the fiber and the ferrule.

The invention can also be viewed as providing a method for securing an optical fiber in a ferrule of a fiber optic connector. In this regard, the method can be broadly summarized by the following steps: A cavity is formed in an endface of the ferrule into which a disk of malleable material is inserted. The disk includes an aperture for receiving the fiber therethrough. The disk is deformed in such a manner that the disk mechanically grips the fiber to thereby prevent relative movement between the fiber and the ferrule.

Advantageously, a technician can secure an optical fiber to the ferrule by using a simple tool designed to compress the disk in the endface of the ferrule until it firmly grips the fiber. Thus, the fiber can be secured in the ferrule as part of the installation process without the use of any adhesive or epoxy, which is particularly useful in a field setting.

DETAILED DESCRIPTION

As used herein, a "ferrule" is a relatively hard structure adapted to receive and support an optical fiber near the end or at the end of the optical fiber. A ferrule is typically adapted to assist in providing alignment of an optical fiber with a corresponding optical fiber of a mated fiber optic connector. In the case of single-fiber ferrules, such ferrules are often cylindrical and often have a construction made of ceramic or of relatively hard plastic. Examples of these types of ferrules can include SC ferrules and LC ferrules. Ferrules can also include multi-fiber ferrules that receive and support a plurality of optical fibers. An example multi-fiber ferrule can include an MPO ferrule.

As used herein, a bare fiber is a section of optical fiber that does not include any coating. Instead, the bare fiber includes a core surrounded by a cladding layer. The optical fiber is "bare" because the cladding layer is exposed and not covered by a supplemental coating layer such as acrylate.

In many prior art connectors, before insertion of a cable into a connector body, an adhesive, or a thermosetting epoxy, is injected into a bore of a ferrule, followed by threading the fiber through the bore. This conventional method of bonding the optical fiber in the bore of the ferrule with epoxy-based adhesive to prevent movement of the optical fiber relative to the ferrule is challenging. As discussed hereinbefore, the use of adhesives or epoxies can sometimes make the manufacturing process difficult because of the challenges that epoxy typically presents.

Other techniques that mount an optical fiber in a ferrule without use of any epoxy include mechanically securing a fiber in a ferrule, as by use of a crimping sleeve, pin, insert member, collet, or a shape memory material that radially compresses a part of the connector body upon the exterior of the fiber.

Recently in order to improve efficiency of mounting an optical fiber in a ferrule, the ferrule can be made of a plastically deformable material to be irradiated by a non-contact energy source (e.g., a laser, plasma discharge etc.) to cause the deformable ferrule bore to tightly bind against the optical fiber. A mechanical deformation may also be used to bind an optical fiber in a ferrule. In other prior art connectors, a ferrule can be heated using an electrical heating source or oven to cause thermal expansion. A bore of the ferrule can increase in diameter as a result of the thermal expansion such that an optical fiber can be inserted therein. Once the ferrule is cooled (passively or actively), the ferrule bore can decrease in diameter and form a mechanical interface with the optical fiber which can be subsequently fused (e.g., merged, melted, welded, etc.) together.

One aspect of the present disclosure provides an improved process for easily securing an optical fiber within a ferrule of a fiber optic connector which negates the use of epoxies or adhesives.

Figure 1:
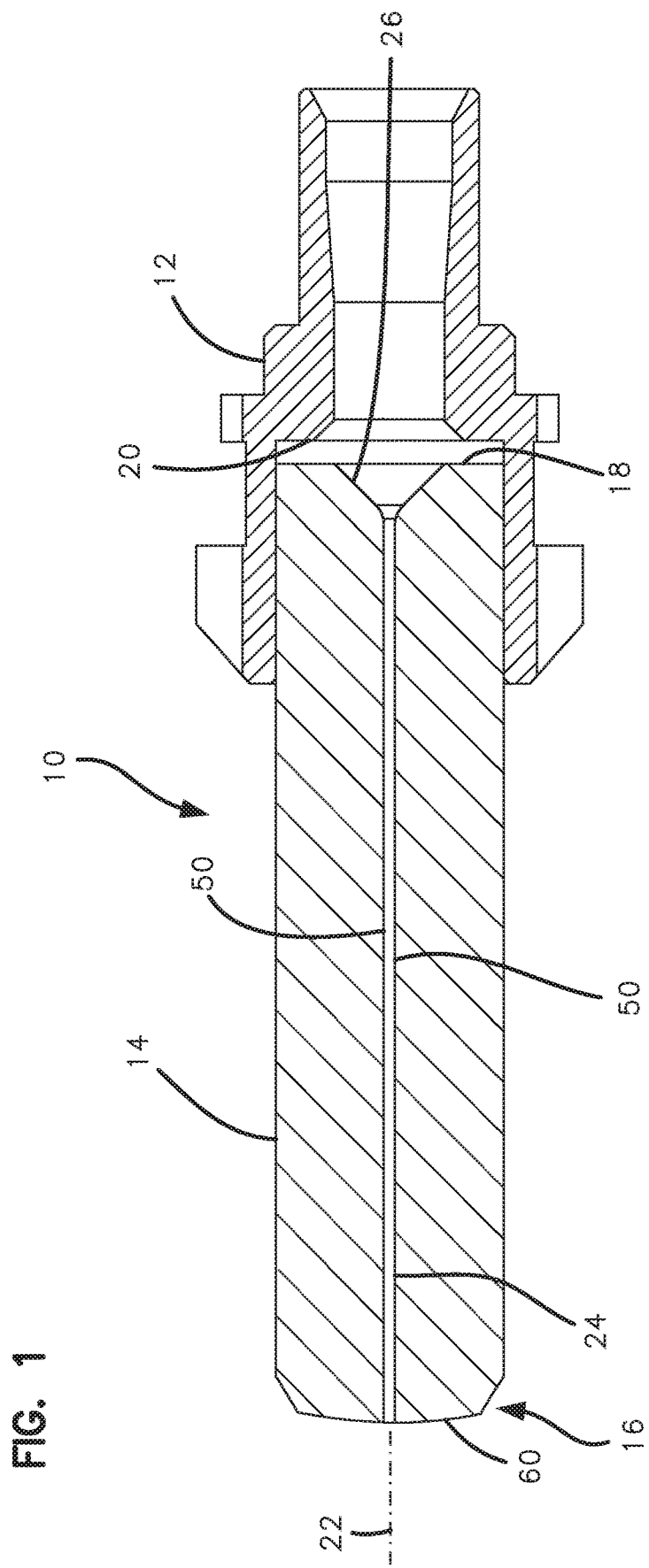
FIG. 1 is a cross-sectional side view of a ferrule and hub in accordance with the principles of the present disclosure.

Referring now to FIG. 1, an example fiber optic ferrule 10 is shown mounted to a hub 12 that can be used with a typical fiber optic connector (not shown). Generally, ferrule 10 and hub 12 are secured together by convenient methods including press fit or adhesive mounts. Ferrule 10 and hub 12 can be mounted within a connector housing (not shown). The connector housing can be one of a variety of well known connector types, including SC, FC, ST, LX.5, LC, and others. As will be described below, ferrule 10 and hub 12 are connected to an end of a fiber optic cable 9 (see FIG. 7) for use in connectorizing an end of the fiber optic cable 9.

The ferrule 10 includes a body 14 with a first end 16 (e.g., front end, distal end) defining a ferrule tip. The body 14 of the ferrule 10 includes an opposite end 18 (e.g., rear end, proximal end) received in a pocket 20 of the hub 12. The ferrule 10 defines a central longitudinal axis 22. The first end 16 of the ferrule 10 is typically polished along with the fiber after the fiber is installed. In certain examples, the ferrule 10 is generally cylindrical. In certain examples, the ferrule 10 has a diameter in the range of 1-3 millimeters or in the range of 1.25-2.5 millimeters. In certain examples, the ferrule 10 has a length L1 (see FIG. 2) in the range of 5-15 millimeters (mm), or in the range of 8-12 mm.

In certain examples, the body 14 of the ferrule 10 is typically ceramic in construction, although alternatives are possible. In other examples, the ferrule 10 can be made of alternative materials such as Ultem, thermoplastic materials such as Polyphenylene sulfide (PPS), zirconium, other engineering plastics or various metals.

The ferrule 10 includes a central passage 24 (e.g., ferrule bore, fiber-receiving passage, an undersized bore) concentric with the central axis 22. The central passage 24 of the ferrule 10 includes an inner surface 50 that comprises a thermoplastic material. The central passage 24 extends from the first end 16 to the opposite end 18. The ferrule 10 can be precision bored to form the central passage 24. In prior art ferrules, the central passage is nominally larger than the diameter of, for example, an optical fiber so as to facilitate insertion of the fiber during installation. In contrast, the central passage 24 of the ferrule 10 is advantageously nominally smaller than the diameter of, for example, an optical fiber at 125 microns. That is, the ferrule 10 has an undersized central passage 24. The central passage 24 can have a uniform diameter. A tapered portion 26 (e.g., conical transition) can extend from the opposite end 18 to the central passage 24.

Figure 2:
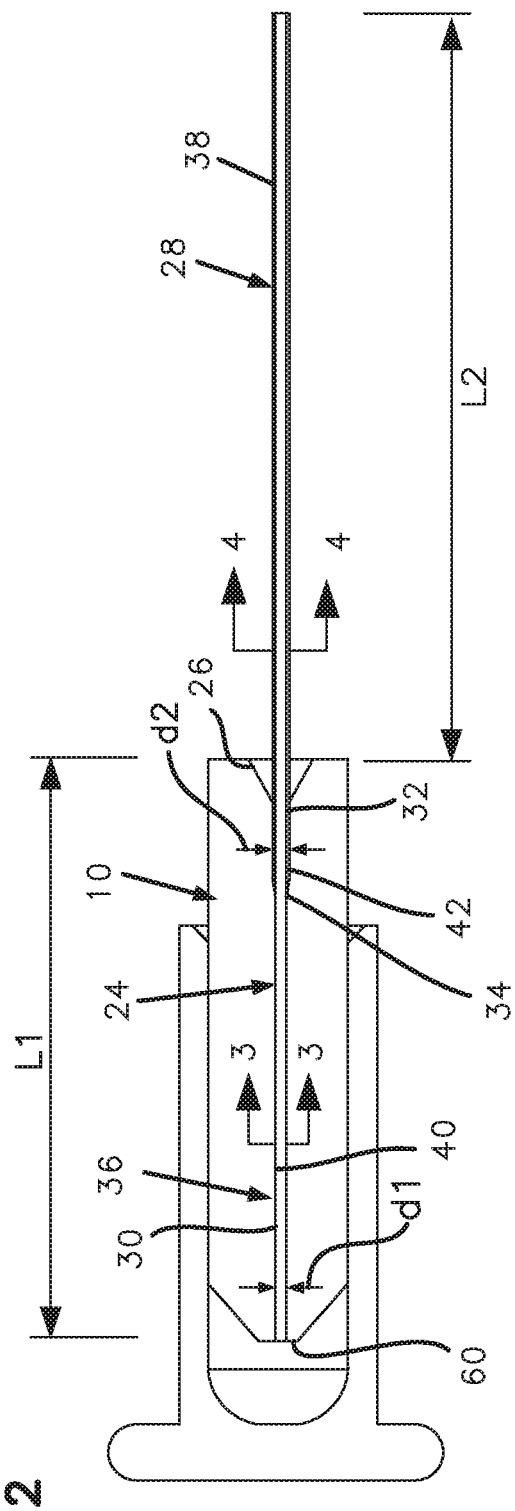
FIG. 2 is a longitudinal cross-sectional view of the ferrule of FIG. 1 including an optical fiber and a dust cap installed on the ferrule.

Referring to FIG. 2, the ferrule 10 includes an optical fiber 28. The central passage 24 has a stepped-configuration with a first passage segment 30 having a first diameter d1 and a second passage segment 32 having a second diameter d2. The second diameter d2 is larger than the first diameter d1. A diameter step 34 provides a transition from the first diameter d1 to the second diameter d2. The first passage segment 30 extends from the first end 16 of the ferrule 10 to the diameter step 34. The second passage segment 32 extends from the diameter step 34 toward the opposite end 18 of the ferrule 10. In certain embodiments, the first diameter d1 is about 125.5 microns with a tolerance of +1 micron. In certain embodiments, the second diameter d2 can be about 250 microns so as to accommodate a coated optical fiber, or about 900 microns so as to accommodate a coated and buffered optical fiber. In one example, d1 is in the range of 230-260 microns and d2 is in the range of 500-1100 microns.

Figure 4:
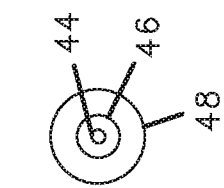
FIG. 4 is a cross-sectional view taken along section line 4-4 of FIG. 2, the cross-section shows a coated fiber portion of the ferrule.
Figure 5:
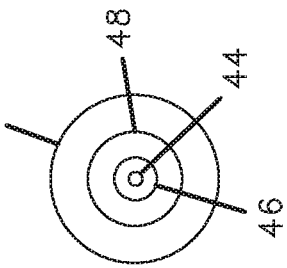
FIG. 5 is a cross-sectional view showing an alternative configuration for the coated fiber portion of FIG. 4.
Figure 3:
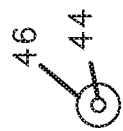
FIG. 3 is a cross-sectional view taken along section line 3-3 of FIG. 2, the cross-sectional view shows a bare fiber portion of an optical fiber of the ferrule.

The optical fiber 28 includes a first portion 36 secured within the central passage 24 and a second portion 38 that extends rearwardly from the opposite end 18 of the ferrule 10. The second portion 38 can be referred to as a "pigtail" or as a "free end portion." The first portion 36 of the optical fiber 28 includes a bare fiber segment 40 that fits within the first passage segment 30 of the ferrule 10 and a coated fiber segment 42 that fits within the second passage segment 32 of the ferrule 10. The bare fiber segment 40 is preferably bare glass and, as shown at FIG. 3, includes a core 44 surrounded by a cladding layer 46. In a preferred embodiment, the bare fiber segment 40 has an outer diameter that is no more than 0.4 microns smaller than the first diameter d1. In certain embodiments, the coated fiber segment 42 includes one or more coating layers 48 surrounding the cladding layer 46 (see FIG. 4). In certain embodiments, the coating layer or layers 48 can include a polymeric material such as acrylate having an outer diameter in the range of about 230-260 microns. In still other embodiments, the coating layer/layers 48 can be surrounded by a buffer layer 52 (e.g., a tight or loose buffer layer) (see FIG. 5) having an outer diameter in the range of about 500-1100 microns.

The second portion 38 of the optical fiber 28 preferably has a length L2 that is relatively short. For example, in one embodiment, the length L2 of the second portion 38 is less than the length L1 of the ferrule 10. In still other embodiments, the length L2 is no more than 20 mm, or is no more than 15 mm, or is no more than 10 mm. In still other embodiments, the length L2 of the second portion 38 is in the range of 1-20 mm, or in the range of 1-15 mm, or in the range of 1-10 mm, or in the range of 2-10 mm, or in the range of 1-5 mm, or in the range of 2-5 mm, or less than 5 mm, or less than 3 mm, or in the range of 1-3 mm.

Figure 6:
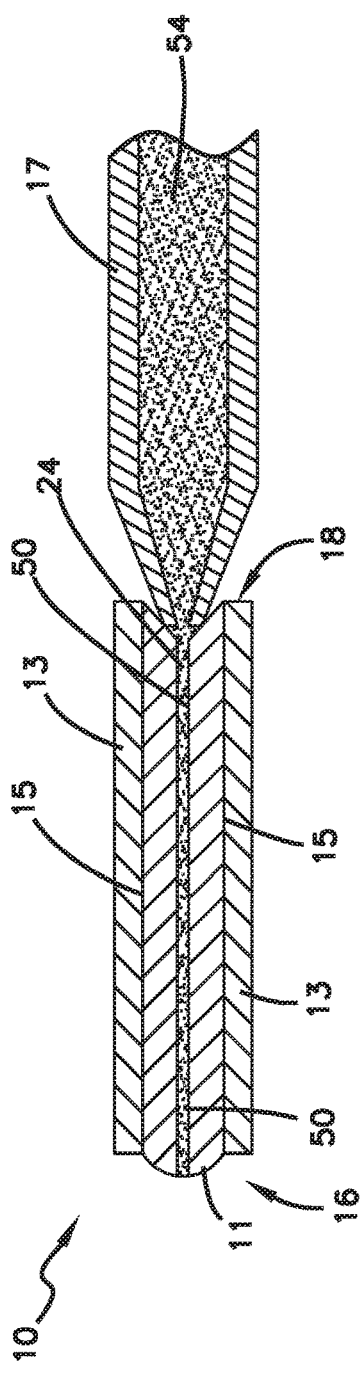
FIG. 6 is a schematic cross-sectional view of a ferrule including a sleeve and a solvent agent being applied within the ferrule in accordance with the principles of the present disclosure.

Turning to FIG. 6, the example ferrule 10 includes a thermoplastic core 11 and a sleeve 13. In certain examples, the thermoplastic core 11 can be molded into an interior surface 15 of the sleeve 13. Thus, the thermoplastic core 11 can be integrally formed with (e.g., molded as a unitary component) the sleeve 13, although alternatives are possible. In certain examples, the thermoplastic core 11 can be coupled to (e.g., when the thermoplastic core 11 is formed as a separate component) the sleeve 13. The thermoplastic core 11 can define the central passage 24 for receiving the optical fiber 28.

In certain examples, the thermoplastic core 11 can be made with a ceramic material, although alternatives are possible. In certain examples, the thermoplastic core 11 of the ferrule 10 can be made of alternative materials such as Ultem, thermoplastic materials such as Polyphenylene sulfide (PPS), zirconium, or other engineering plastics.

In certain examples, the sleeve 13 can comprise a metallic material, such as, but not limited to, stainless steel, tungsten carbide. The sleeve 13 can be utilized to help improve wear resistance as a result of repeated use.

In certain examples, the sleeve 13 can have an outer diameter in the range of about 1.5 mm to about 2.5 mm, although alternatives are possible. In certain examples, the thermoplastic core 13 may have a thickness in the range of about 0.2 mm to about 0.5 mm, although alternatives are possible. In certain examples, the thermoplastic core 13 may have a thickness of at least about 1.0 mm.

Although the ferrule 10 is shown with a sleeve 13, it will be appreciated that the ferrule 10 can be utilized without the sleeve 13 in accordance with the principles of the present disclosure. That is, the process of securing the optical fiber 28 within the ferrule 10 can be performed in accordance with the principles of the present disclosure irrespective of whether the sleeve 13 is included.

In preparation of bonding the optical fiber 28 in the ferrule 10, the central passage 24 can be exposed to a solvent agent 54 (e.g., base solvent). In certain examples, the solvent agent 54 can be injected into the central passage 24 of the ferrule 10 by, for example, a nozzle 17 prior to inserting the optical fiber 28 to be connected.

Figure 7:
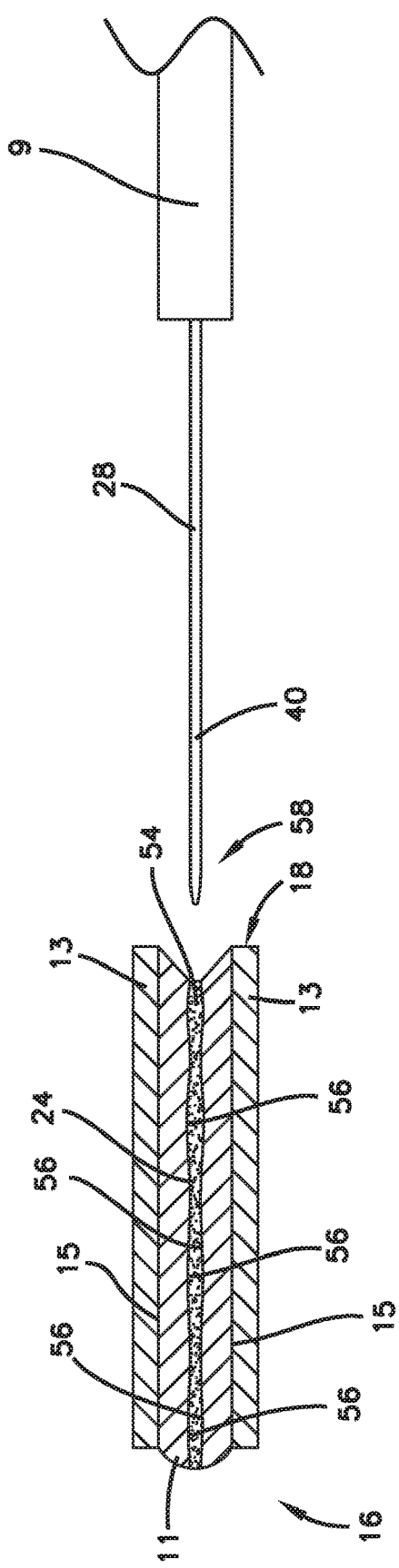
FIG. 7 is a schematic cross-sectional view of the ferrule of FIG. 6 prior to insertion of the optical fiber.

Turning to FIG. 7, once the solvent agent 54 is injected into the central passage 24, the solvent agent 54 can dissolve into and soften an interfacial layer 56 (e.g., thin layer) of the inner surface 50 of the central passage 24 of the ferrule 10. In certain examples, the interfacial layer 56 will soften in at least 60 seconds, although alternatives are possible. In certain examples, the interfacial layer 56 will soften in less than 60 seconds, although alternatives are possible. Upon reaching a sufficient softness (e.g., in about 60 seconds), a stripped bare optical fiber 28 can be inserted through the central passage 24 of the ferrule 10.

In certain examples, the solvent agent 54 can comprise an acetone. In certain examples, the solvent agent 54 can comprise at least one of cyclohexanone, methylene chloride, methyl ethyl ketone, trichloroethylene, or any combination of these solvents. It will be appreciated that those skilled in the art will recognize that other solvents suitable for bonding polymer materials may be used. It is critical to control the application of the solvent agent 54 such that the concentration and exposure time are closely monitored.

Figure 8:
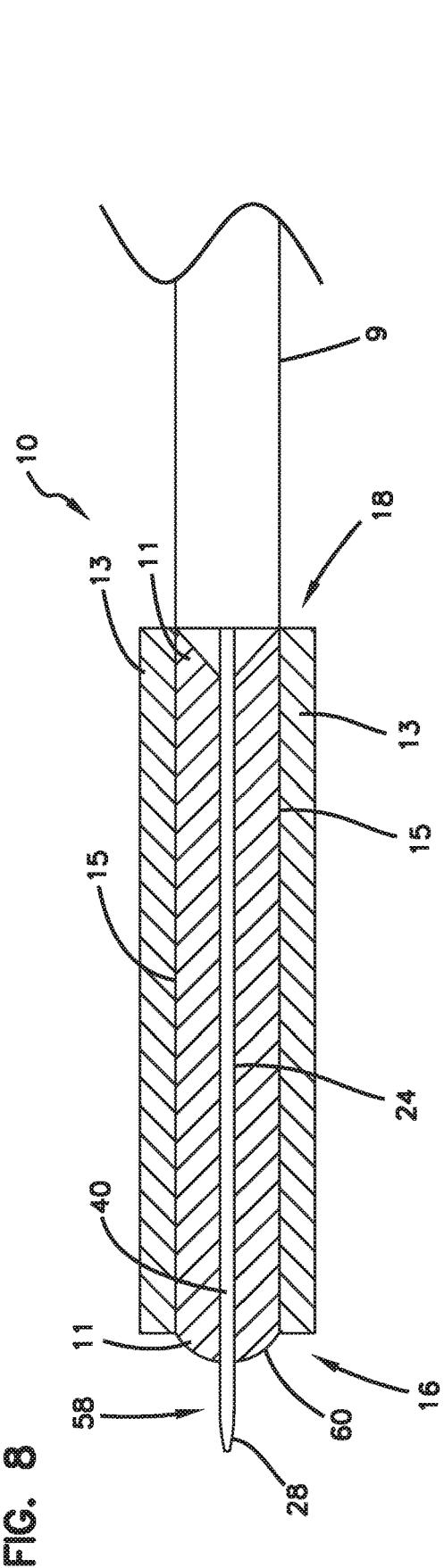
FIG. 8 is a schematic cross-sectional view of the ferrule of FIG. 7 after insertion of the optical fiber.

The optical fiber 28 can be inserted into the central passage 24 through the rear end 18 of the ferrule 10. During insertion, the optical fiber 28 is oriented such that the bare fiber segment 40 leads the optical fiber 28 through the ferrule 10. After insertion, an end portion 58 of the bare fiber segment 40 projects outwardly from an end face 60 of the ferrule 10 (see FIG. 8). The solvent delivery and fiber insertion steps can be automated, although alternatives are possible. During such steps, the ferrule can be held by an automated ferrule handler.

Upon insertion of the optical fiber 28 into the central passage 24, the optical fiber 28 can displace the now softened thermoplastic of the interfacial layer 56 of the inner surface 50 such that the optical fiber 28 can be in intimate contact with the ferrule 10. The optical fiber 28 can be inserted into the central passage 24 of the ferrule 10 such that the end portion 58 of the optical fiber 28 projects out from the central passage 24 beyond the end face 60 of the ferrule 10 (see FIG. 8). In certain examples, the end face 60 of the ferrule 10 may have a radius configuration. In certain examples, the end face 60 of the ferrule 10 may have a flat configuration.

The solvent agent 54 can dissolve and chemically soften the interfacial layer 56 of the inner surface 50 of the central passage 24 at room temperature. That is, an external heat source is not required for the solvent agent 54 to chemically soften the central passage 24. In certain examples, the solvent agent 54 can dissolve and chemically soften the central passage 24 at a temperature in a range from room temperature to about 100° C., although alternatives are possible.

The depth of the softened polymer may be controlled by the type of solvent used, solvent concentration, exposure time and temperature. Because of the relatively tight tolerance between the bare fiber segment 40 of the optical fiber 28 and the first portion 36 of the central passage 24, the surface tension between the solvent agent 54 within the central passage 24 and the optical fiber 28 provides a self-centering function that assists in centering the bare fiber segment 40 within the first passage segment 30. The bare fiber segment 40 of the optical fiber 28 can be adapted to merge with the central passage 24 to form a monolithic bond in the ferrule 10.

After the solvent agent 54 evaporates (e.g., dissipates), the softened polymer of the interfacial layer 56 of the inner surface 50 of the central passage 24 can re-solidify to fix (e.g., secure, become set) the bare fiber segment 40 of the optical fiber 28 within the central passage 24 of the ferrule 10. The monolithic bond formed between the optical fiber 28 and the central passage 24 of the ferrule 10 results in an adhesive-free or epoxy-free attachment of the bare fiber segment 40 of the optical fiber 28 to the ferrule 10. That is, the optical fiber 28 can be secured within the ferrule 10 via chemical bonding.

After the central passage 24 of the ferrule 10 has re-solidified, the optical fiber 28 can be further processed (e.g., cleaved and polished) mechanically or via a non-contact energy source such as a laser or via an abrasive jet operation. The end face 60 of the ferrule 10 can be polished using standard polishing procedures so that the optical fiber 28 is in an optimal condition for transmission. Polishing can be a multi-step process where the end-face of the ferrule and the fiber are gradually worked and reshaped using different grade polishing materials until the desired radius, angle, flatness and surface quality (roughness) is achieved. It will be appreciated that the polishing process can include multiple polishing steps using different polishing pads and polishing compounds having different degrees of abrasiveness.

In certain examples, a laser can be used to process an end face of an optical fiber before the optical fiber is loaded into a ferrule bore within a ferrule. Characteristics of the laser (focal spot intensity, interaction time, wave length, pulse length) are selected so that the laser effectively rounds and shapes the end face of the optical fiber and helps remove imperfections. In other embodiments, a plasma treatment or other energy source can be used to process the end face of the optical fiber.

Figure 9:
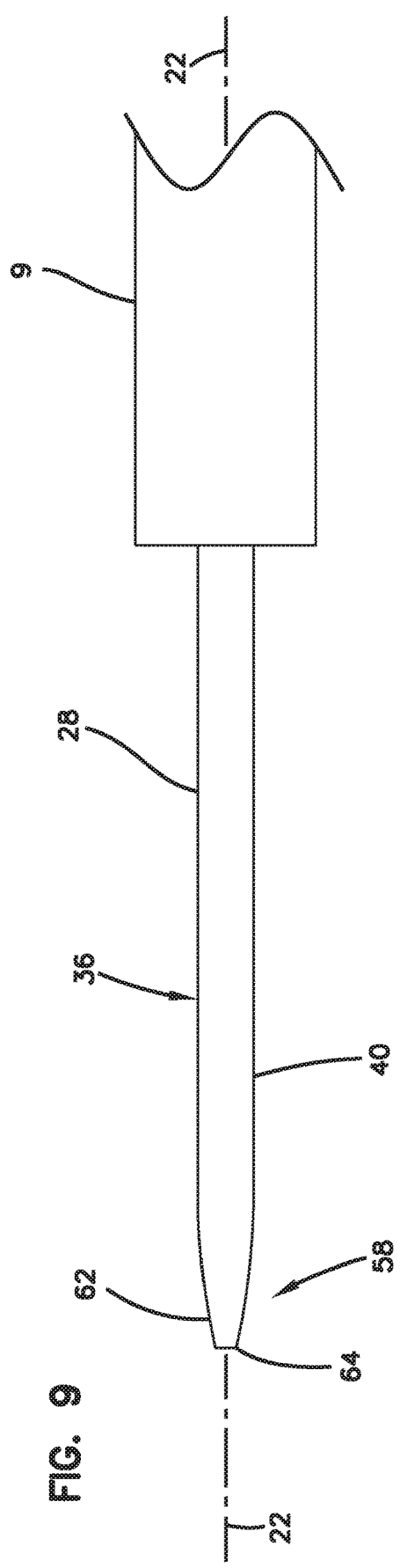
FIG. 9 is a schematic view of the optical fiber of FIG. 7 with a bullet nose in accordance with the principles of the present disclosure.

Referring to FIG. 9, the end portion 58 of the optical fiber 28 may include a bullet nose shape 62. The bullet nose shape 62 may be formed by placing the bare fiber segment 40 under tension in combination with heating the bullet nose zone or taper location until the optical fiber 28 begins to soften and pull apart (e.g., neck down). The optical fiber 28 then breaks, which leaves a taper, bullet nose shape 62.

The bullet nose shape 62 may comprise cross sections orthogonal to the central longitudinal axis 22 which are concentric or substantially concentric about the central longitudinal axis 22 and tapered along the central longitudinal axis 22 to an end point 64. In this manner, the bare fiber segment 40 of the first portion 36 of the optical fiber 28 may be available to be easily inserted through the central passage 24 of the ferrule 10 and precisely located relative to the ferrule 10. It will be appreciated that the bullet nose shape 62 may be processed to final shape, for example, a planar shape before an optical connection may be established.

The preparation of the optical fiber 28 can be performed by a variety of methods. For example, a laser, plasma treatment, or other energy source may be used.

Cleaving an optical fiber refers to creating a mirror flat surface on the face of the optical fiber for efficient light coupling into the fiber. In certain examples, a pre-cleaved optical fiber may have a flat end face, although alternatives are possible. There are several techniques that can be employed in cleaving optical fibers.

Conventionally, cleaving is performed using a diamond blade to make a small crack on the surface of the optical fiber and then applying tension to the optical fiber to make this crack propagate. Mechanical cleavers are known in the art and may also be used, although alternatives are possible. Fiber end face cleaving can also be accomplished with precision using a laser cleaver, although alternatives are possible. These are only some examples, many other techniques may be used and will be apparent to one skilled in the art.

In some preferred embodiments, the optical fiber is only cleaved before insertion into the ferrule. No further cleaving is performed in these embodiments, following insertion of the fiber into the ferrule and securing therein. In certain examples, the ferrule end face can be polished without a post-curing cleave in preferred connectors and methods, saving time and reducing waste.

The present disclosure also relates to a method of securing an optical fiber to a ferrule of an optical connector. The method includes the following steps:

(a) disposing a solvent agent in a fiber-receiving passage defining an inner surface of the ferrule;

(b) dissolving the solvent agent into the inner surface of the ferrule to chemically soften an interfacial layer of the inner surface of the fiber-receiving passage;

(c) inserting the optical fiber into the fiber-receiving passage and into contact with the softened interfacial layer; and (d) bonding the optical fiber in the fiber-receiving passage of the ferrule.

For the step (d), bonding the optical fiber can include evaporating the solvent agent to re-solidify the softened interfacial layer to maintain the optical fiber position within the fiber-receiving passage. In certain examples, prior to the step of inserting the optical fiber, a step of cleaving an end portion of the optical fiber with a heat source while the optical fiber remains under tension can occur so that the end portion of the optical fiber is formed with a bullet nose shape.

The fiber optic connector according to the present disclosure can be embodied in an LC type connector. It should be appreciated that the principles of the disclosure disclosed herein can be applied to other known optical connectors, such as ST, SC, FC, MPO, and other varieties.

From the foregoing detailed description, it will be evident that modifications and variations can be made without departing from the spirit and scope of the disclosure.

What is claimed is:

1. A method for securing an optical fiber to a ferrule of an optical connector, the method comprising the steps of:
   (a) disposing a solvent agent in a fiber-receiving passage defining an inner surface of the ferrule;
   (b) dissolving the solvent agent into the inner surface of the ferrule to chemically soften an interfacial layer of the inner surface of the fiber-receiving passage;
   (c) inserting the optical fiber into the fiber-receiving passage and into contact with the softened interfacial layer; and
   (d) bonding the optical fiber in the fiber-receiving passage of the ferrule;
   (e) wherein the step of bonding the optical fiber in the fiber-receiving passage is adhesive-free or epoxy-free.

2. The method according to claim 1, wherein the step of bonding the optical fiber includes evaporating the solvent agent to re-solidify the softened interfacial layer to maintain the optical fiber position within the fiber-receiving passage.

3. The method according to claim 1, wherein the solvent agent comprises methyl ethyl ketone.

4. The method according to claim 1, wherein the solvent agent comprises an acetone.

5. The method according to claim 1, wherein the solvent agent consists essentially of one or more cyclohexanone, methylene chloride, and trichloroethylene.

6. The method according to claim 1, wherein the step of bonding the optical fiber comprises heating the ferrule.

7. The method according to claim 1, wherein the ferrule is made of ceramic material.

8. The method according to claim 1, further comprising, prior to the step of inserting the optical fiber, cleaving an end portion of the optical fiber with a heat source while the optical fiber remains under tension so that the end portion of the optical fiber is formed with a bullet nose shape.

9. The method according to claim 1, wherein the step of dissolving the solvent agent is carried out at room temperature.

10. The method according to claim 1, wherein the ferrule includes a sleeve.

11. The method according to claim 10, wherein the sleeve is made of metallic material.

12. A method for securing an optical fiber to a ferrule of an optical connector, the method comprising the steps of:
   disposing a solvent agent in a fiber-receiving passage defining an inner surface of the ferrule;
   dissolving the solvent agent into the inner surface of the ferrule to chemically soften an interfacial layer of the inner surface of the fiber-receiving passage;
   inserting the optical fiber into the fiber-receiving passage and into contact with the softened interfacial layer; and
   bonding the optical fiber in the fiber-receiving passage of the ferrule;
   wherein the solvent agent comprises methyl ethyl ketone.

13. A method for securing an optical fiber to a ferrule of an optical connector, the method comprising the steps of:

disposing a solvent agent in a fiber-receiving passage defining an inner surface of the ferrule;

dissolving the solvent agent into the inner surface of the ferrule to chemically soften an interfacial layer of the inner surface of the fiber-receiving passage;

inserting the optical fiber into the fiber-receiving passage and into contact with the softened interfacial layer; and bonding the optical fiber in the fiber-receiving passage of the ferrule;

wherein the solvent agent consists essentially of one or more cyclohexanone, methylene chloride, and trichloroethylene.

* * * * *